UNITED STATES PATENT OFFICE.

JOSEPH S. STILLWELL, OF WEST ORANGE, NEW JERSEY.

MALTED WHEY.

1,041,896.
No Drawing.

Specification of Letters Patent. Patented Oct. 22, 1912.
Application filed February 14, 1912. Serial No. 677,545.

*To all whom it may concern:*

Be it known that I, JOSEPH S. STILLWELL, residing at West Orange, in the county of Essex and State of New Jersey, have invented a new and useful malted whey to be used in the manufacture of bread, cake, biscuits, and similar products for the purpose of increasing the nourishing qualities, adding to the flavor, stimulating the action of the yeast, and improving the qualities in general of said products.

Said composition is formed by treating whey with a solution of malt extract containing active enzyms.

By whey, I refer to that portion of milk, either of cows or other animals, which remains after removing all or the greater part of the fat and casein. This commonly occurs in the manufacture of cheese, which is made from the fat and casein of the milk, and also when the butter fat is skimmed from the milk for butter making purposes, and the skimmed milk is further treated to remove the casein, leaving the milk sugar, albumin, and milk salts in a solution, which is called the whey.

Whey ordinarily consists of about the following ingredients, in about the following proportions; viz; water, 92 to 93%, fat, 0.20 to 0.35%, milk sugar, 4 to 5%, proteids, 0.70 to 1.0%, ash 0.50 to 0.60%. These figures refer to cows milk whey.

By malt extract I mean any extract prepared from cereals by the process of malting or sprouting the whole or a portion of said cereals, and subjecting them to the dissolving action of water. In place of the water I may use the whey itself as the dissolving or extracting agent.

By the active enzyms of malt I refer to the active principles of its digestive juices, among which are diastase, amylase, peptase, cytase, pectase, etc.

In preparing said composition, I mix the malt extract and whey together in such proportions as may be desired, for example a good proportion for use in breadmaking may be that in which the resultant mixture contains about two thirds malt extract solids and one third whey solids, but I do not confine my claims to these proportions. I maintain this mixture at such a temperature and state of dilution and for such a period of time that all or a portion of the digestive power of the malt enzyms may act on the whey solids, or may interact with any of the milk enzyms which may survive in the whey.

In carrying out this process I prefer to take the whey as it occurs immediately after the removal of the fat and casein from the milk, pasturize it, reduce its temperature to between ninety and one hundred and twenty five degress Fahrenheit, mix it thoroughly with a five to twenty per cent. malt extract solution at about the same temperature, and maintain the mixture for about an hour between these two temperatures, the optimum being about one hundred and thirteen degrees Fahrenheit; but I do not wish to be understood as limiting myself to these exact temperatures, dilutions, or periods, as any temperature, dilution, and period of time permitting the action of the malt enzyms on the whey solids will give a more or less valuable compound for breadmaking.

The compound may be used directly in its dilute state in the breadmaking formula, or it may be reduced to a syrup, and for transportation and commercial purposes this is the most convenient form; the syrup being made by evaporating off the bulk of the water, and conducting this operation in a vacuum or by other means so that the enzyms, albumin and sugars are not injured, that is at temperatures preferably below 132 degrees Fahrenheit, or the lowest coagulating point of albumin. The compound may also be reduced to the powder form by any of several well known processes of desiccation, preferably by those in which the enzyms and albumin are not injured, such as the process of atomizing the dilute or better the partly concentrated solution of whey and extract in a current of warm air.

The syrup and powder forms of the compound are preferably diluted with water before mixing with the other ingredients of the bread formula, or they may be mixed with the liquids of the bread formula, or the yeast liquors.

The peptones and other digestive products of the action of the enzyms of the malt extract on the whey solids are not only excellent nourishing and flavoring agents for the bread, biscuit, etc., but also stimulate the action of the yeast, and the yeast is further improved by allowing it to stand for some time after mixing with the compound, either with or without the addition of a little flour or flaked cereal, before adding to the rest of the materials of the bread formula.

I may neutralize the acidity, due to lactic or other organic acids, which either the malt extract or whey, or both generally have to a greater or less extent, with suitable alkalis, such as ammonia, potassium, sodium, or lime, preferably one or both of the two former, and I prefer not to carry the neutralization out completely, but leave the compound slightly acid. I have discovered that the salts resulting from the neutralization of said acids, have a favorable effect on the process of breadmaking, and particularly on the action of the yeast in said process.

I claim:

1. The herein described composition of matter, consisting of malt extract and whey, substantially as described and for the purposes specified.

2. A composition of matter for use in breadmaking consisting of malt extract containing active enzyms mixed with whey, the solids of the whey being modified by the action of said malt enzyms.

3. The herein described composition of matter, consisting of malt extract and whey, the acidity of said compound being neutralized by an alkali, substantially as described and for the purposes specified.

4. A composition of matter for use in breadmaking consisting of malt extract containing active enzyms mixed with whey, the solids of the whey being modified by the action of malt enzyms, and the acidity of the compound neutralized by an alkali.

In witness whereof I have hereunto set my hand this twelfth day of February, 1912.

JOSEPH S. STILLWELL.

Witnesses:
 M. V. KING,
 L. WILCOX.